US012107366B2

(12) United States Patent
Li et al.

(10) Patent No.: US 12,107,366 B2
(45) Date of Patent: Oct. 1, 2024

(54) CONNECTOR AND CONNECTOR ASSEMBLY

(71) Applicant: Tyco Electronics (Shanghai) Co. Ltd., Shanghai (CN)

(72) Inventors: Jianxiong Li, Shanghai (CN); Yuchen Yang, Shanghai (CN); Reicky Zhang, Shanghai (CN); Haomai Yin, Shanghai (CN); Xionghui Zheng, Suzhou (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 402 days.

(21) Appl. No.: 17/696,205

(22) Filed: Mar. 16, 2022

(65) Prior Publication Data

US 2022/0302644 A1 Sep. 22, 2022

(30) Foreign Application Priority Data

Mar. 19, 2021 (CN) ......................... 202120566205.1

(51) Int. Cl.
*H01R 13/627* (2006.01)
*H01R 13/502* (2006.01)
(Continued)

(52) U.S. Cl.
CPC ....... *H01R 13/6272* (2013.01); *H01R 13/502* (2013.01); *H01R 13/629* (2013.01); *H01R 13/639* (2013.01)

(58) Field of Classification Search
CPC ......................... H01R 13/6272; H01R 13/502; H01R 13/629; H01R 13/639
See application file for complete search history.

(56) References Cited

U.S. PATENT DOCUMENTS 4,229,064 A 10/1980 Vetter et al.
4,542,952 A 9/1985 Tomsa
(Continued)

FOREIGN PATENT DOCUMENTS

CN 207021444 2/2018
CN 110581391 A 12/2019
(Continued)

*Primary Examiner* — Abdullah A Riyami
*Assistant Examiner* — Nelson R. Burgos-Guntin
(74) *Attorney, Agent, or Firm* — Potomac Law Group, PLLC

(57) ABSTRACT

The present invention discloses a connector and a connector assembly. The connector has a housing and a latch safety. The latch safety is slidably mounted on the housing and adapted to move between a safety position to prevent the mating connector from being unlocked and a pre-locking position to allow the mating connector to be unlocked. A guide slot is formed on an outer wall of the connector and surrounded by a first end wall and a second end wall spaced from each other in a circumferential direction of the housing and two side walls spaced from each other in an axial direction of the housing. The latch safety has a sliding plate slidably installed in the guide slot, and the sliding plate has a first end and a second end spaced from each other in the circumferential direction and a front and rear sides spaced from each other in the axial direction. When the latch safety is moved to the safety position along the guide slot, the end face of the first end of the sliding plate abuts against the first end wall of the guide slot, so that a human finger cannot contact the end face of the first end of the sliding plate. Therefore, the risk of accidental reset of the latch safety due to misoperation can be avoided, and the use safety is improved.

14 Claims, 12 Drawing Sheets

(51) Int. Cl.
*H01R 13/629* (2006.01)
*H01R 13/639* (2006.01)

(56) References Cited

U.S. PATENT DOCUMENTS

| | | | | |
|---|---|---|---|---|
| 4,764,129 | A | 8/1988 | Jones et al. | |
| 5,190,467 | A | 3/1993 | Ohta | |
| 5,397,196 | A | 3/1995 | Boiret et al. | |
| 5,662,488 | A | 9/1997 | Alden | |
| 5,729,644 | A | 3/1998 | Shiflett et al. | |
| 5,902,155 | A | 5/1999 | Polgar et al. | |
| 6,383,032 | B1 | 5/2002 | Gerberding | |
| 6,769,813 | B2 | 8/2004 | Cheng | |
| 7,258,493 | B2 | 8/2007 | Milette | |
| 7,347,742 | B2 * | 3/2008 | Hall | H01R 13/741 439/752 |
| 7,347,745 | B1 * | 3/2008 | Raudenbush | H01R 13/4223 439/752 |
| 7,381,072 | B2 | 6/2008 | Nagano | |
| 7,674,046 | B2 | 3/2010 | Milette | |
| 7,909,658 | B2 | 3/2011 | Pfaffenbach | |
| 7,980,894 | B1 * | 7/2011 | Hall | H01R 24/40 439/585 |
| 8,011,942 | B2 | 9/2011 | Ohmori et al. | |
| 8,968,021 | B1 * | 3/2015 | Kennedy | H01R 13/641 439/352 |
| 9,437,961 | B1 | 9/2016 | Smajda | |
| 9,595,789 | B1 * | 3/2017 | Ehrman | H01R 13/62938 |
| 9,680,256 | B1 * | 6/2017 | Lane | H01R 13/6275 |
| 9,837,761 | B1 * | 12/2017 | Hardy | H01R 13/565 |
| 9,882,317 | B1 * | 1/2018 | Lane | H01R 24/20 |
| 10,153,581 | B2 | 12/2018 | Mitchell | |
| 10,256,574 | B2 | 4/2019 | Nishida et al. | |
| 10,355,406 | B2 | 7/2019 | Joniak et al. | |
| 10,557,621 | B2 | 2/2020 | Gietl et al. | |
| 10,594,069 | B2 | 3/2020 | Kon et al. | |
| 10,649,152 | B1 * | 5/2020 | Yang | G02B 6/3849 |
| 10,847,927 | B2 | 11/2020 | Maddens et al. | |
| 10,862,243 | B2 | 12/2020 | Nishiyama | |
| 11,011,871 | B2 | 5/2021 | Fujiwara et al. | |
| 11,070,013 | B2 | 7/2021 | Brandt | |
| 11,075,492 | B2 | 7/2021 | You et al. | |
| 11,108,192 | B2 | 8/2021 | Tie et al. | |
| 11,381,033 | B2 | 7/2022 | Johnson et al. | |
| 11,482,809 | B2 | 10/2022 | Zebhauser | |
| 11,588,286 | B2 | 2/2023 | Van Dommelen et al. | |
| 11,594,838 | B2 | 2/2023 | Little | |
| 11,705,660 | B2 | 7/2023 | Reichel | |
| 11,715,908 | B2 | 8/2023 | Haynes et al. | |
| 2004/0192099 | A1 * | 9/2004 | Seminara | H01R 13/639 439/352 |
| 2005/0208820 | A1 | 9/2005 | Sanuki | |
| 2007/0020986 | A1 * | 1/2007 | Fry | H01R 13/6272 439/357 |
| 2007/0054535 | A1 * | 3/2007 | Hall | H01R 13/741 439/352 |
| 2007/0105417 | A1 | 5/2007 | Camelio | |
| 2009/0029584 | A1 | 1/2009 | Sami | |
| 2009/0191750 | A1 * | 7/2009 | Kadar-Kallen | H01R 13/639 439/578 |
| 2012/0190234 | A1 | 7/2012 | Montena et al. | |
| 2012/0238124 | A1 * | 9/2012 | Zhao | B60L 3/0069 439/350 |
| 2013/0137287 | A1 | 5/2013 | Grimm | |
| 2013/0209041 | A1 | 8/2013 | Szilagyi et al. | |
| 2016/0181721 | A1 * | 6/2016 | Rauer | H01R 13/508 439/35 |
| 2017/0271815 | A1 * | 9/2017 | Lane | H01R 13/6272 |
| 2018/0034202 | A1 | 2/2018 | Pierce-Jones | |
| 2018/0083397 | A1 * | 3/2018 | Hall | H01R 9/053 |
| 2018/0241154 | A1 * | 8/2018 | Khorrami | H01R 12/737 |
| 2019/0109408 | A1 | 4/2019 | Maddens et al. | |
| 2019/0148868 | A1 | 5/2019 | Pierce-Jones et al. | |
| 2019/0190200 | A1 * | 6/2019 | Chang | H01R 13/6593 |
| 2020/0091661 | A1 * | 3/2020 | Takahashi | H01R 12/716 |
| 2020/0119499 | A1 | 4/2020 | Leischner et al. | |
| 2020/0144758 | A1 * | 5/2020 | Itou | H01R 13/639 |
| 2020/0153159 | A1 * | 5/2020 | Gartenmaier | H01R 43/26 |
| 2020/0212630 | A1 * | 7/2020 | Qiu | H01R 13/641 |
| 2020/0227861 | A1 | 7/2020 | Fujiwara et al. | |
| 2020/0325941 | A1 | 10/2020 | Nakamura et al. | |
| 2020/0398684 | A1 * | 12/2020 | Motomiya | H01R 13/62944 |
| 2020/0412047 | A1 * | 12/2020 | Becavin | H01R 13/6277 |
| 2022/0216651 | A1 | 7/2022 | Nishijima | |

FOREIGN PATENT DOCUMENTS

| | | | |
|---|---|---|---|
| DE | 102012104857 | A1 | 12/2013 |
| DE | 102013018160 | | 2/2015 |
| DE | 102015105832 | A1 | 10/2016 |
| DE | 102017112160 | A1 | 12/2018 |
| EP | 0849839 | A1 | 6/1998 |
| EP | 1154169 | A1 | 11/2001 |
| JP | 2002231375 | A | 8/2002 |
| JP | 2018045883 | A | 3/2018 |
| JP | 2018125078 | A | 8/2018 |
| JP | 2020187891 | A | 11/2020 |
| WO | 2007040013 | A1 | 4/2007 |
| WO | 2016166066 | A1 | 10/2016 |
| WO | 2020071119 | A1 | 4/2020 |
| WO | 2020230583 | A1 | 11/2020 |

* cited by examiner

CONNECTOR AND CONNECTOR ASSEMBLY

CROSS-REFERENCE TO RELATED APPLICATION

This application claims the benefit of Chinese Patent Application No. 202120566205.1 filed on Mar. 19, 2021 in the State Intellectual Property Office of China, the whole disclosure of which is incorporated herein by reference.

BACKGROUND OF THE INVENTION

Field of the Invention

The present invention relates to a connector and a connector assembly comprising the connector.

Description of the Related Art

In the prior art, in order to realize the rapid electrical connection between cables or between cable and electrical equipment, a plug connector and a socket connector suitable for rapid matching with each other are usually adopted. In the prior art, in order to prevent the separation of the matched plug connector and socket connector, an elastic latch is usually arranged on the housing of the plug connector, which is suitable for locking to the housing of the socket connector. Generally, the elastic latch is capable of being unlocked so that the plug connector and socket connector can be separated and reused.

In the prior art, in order to prevent the elastic latch from being accidentally unlocked due to wrong operation, it is necessary to set a latch safety mechanism on the socket connector, which can be moved between a safety position and a pre-locking position (or called an initial position). After the plug connector is inserted into the socket connector, the elastic latch can be kept in the locking position by moving the latch safety mechanism to the safety position, so as to avoid the accidental unlocking of the elastic latch due to wrong operation.

In the prior art, the latch safety mechanism can be pushed to the initial position by fingers, which leads to the risk that the latch safety mechanism will be accidentally reset to the initial position due to misoperation. Once the latch safety mechanism is accidentally reset to the initial position, the elastic latch can be unlocked, which will reduce the use safety.

SUMMARY OF THE INVENTION

The present invention has been made to overcome or alleviate at least one aspect of the above mentioned disadvantages.

According to an aspect of the present invention, there is provided a connector adapted to mate with a mating connector, the connector comprising: a housing; and a latch safety slidably mounted on the housing and adapted to move between a safety position to prevent the mating connector from being unlocked and a pre-locking position to allow the mating connector to be unlocked. A guide slot is formed on an outer wall of the connector and surrounded by a first end wall and a second end wall spaced from each other in a circumferential direction of the housing and two side walls spaced from each other in an axial direction of the housing; the latch safety includes a sliding plate slidably installed in the guide slot, and the sliding plate includes a first end and a second end spaced from each other in the circumferential direction and a front and rear sides spaced from each other in the axial direction; when the latch safety is moved to the safety position along the guide slot, the end face of the first end of the sliding plate abuts against the first end wall of the guide slot, so that a human finger cannot contact the end face of the first end of the sliding plate.

According to an exemplary embodiment of the present invention, an outer surface of the sliding plate is a smooth surface, so that a friction force between the human finger and the outer surface of the sliding plate is not enough to push the latch safety to move.

According to another exemplary embodiment of the present invention, a slot is formed on the end face of the first end of the sliding plate or on an inner wall surface of the first end wall of the guide slot, the slot is configured to prohibit the human finger from being inserted, but allow a corresponding tool to be inserted, and the latch safety is capable of being moved from the safety position to the pre-locking position by the tool inserted into the slot.

According to another exemplary embodiment of the present invention, the front and rear sides of the sliding plate respectively abuts against the two side walls of the guide slot, so as to prevent the front and rear sides of the sliding plate from being contacted by the human finger.

According to another exemplary embodiment of the present invention, a notch is formed on the second end wall of the guide slot and/or the top surface of the second end wall of the guide slot is lower than the outer surface of the sliding plate, so as to allow the human finger to contact the end face of the second end of the sliding plate and push the sliding plate from the pre-locking position to the safety position.

According to another exemplary embodiment of the present invention, when the latch safety is moved to the pre-locking position, the second end of the sliding plate abuts against the second end wall of the guide slot.

According to another exemplary embodiment of the present invention, the latch safety also includes one or more limiting parts connected to the sliding plate; an opening is formed on the housing, and the limiting part extends into the housing through the opening; the front and rear edges of the opening opposite to each other in the axial direction are slidably held between the limiting part and the sliding plate to limit the movement of the latch safety in a radial direction of the housing.

According to another exemplary embodiment of the present invention, an elastic latch adapted to lock the connector is formed on the mating connector, and the latch safety includes a tongue connected to the limiting part; the tongue is adapted to be inserted into a gap between the elastic latch and the outer wall of the mating connector to prevent the elastic latch from being moved to an unlocked position.

According to another exemplary embodiment of the present invention, two positioning grooves extending along the axial direction are formed on a bottom wall of the guide slot, and a positioning rib extending along the axial direction is formed on an inner surface of the sliding plate; when the latch safety is installed in the guide slot and moved to the safety position, the positioning rib is positioned in one of the two positioning grooves; when the latch safety is installed in the guide slot and moved to the pre-locking position, the positioning rib is positioned in the other of the two positioning grooves.

According to another exemplary embodiment of the present invention, an indication arrow is formed on the outer surface of the sliding plate, and a safety position identification and a pre-locking position identification are formed on the outer wall of the housing; when the latch safety is installed in the guide slot and moved to the safety position, the indication arrow points to the safety position identification; when the latch safety is installed in the guide slot and moved to the pre-locking position, the indication arrow points to the pre-locking position identification.

According to another exemplary embodiment of the present invention, the connector further comprises a terminal provided in the housing.

According to another exemplary embodiment of the present invention, the top surface of the first end wall of the guide slot is higher than the outer surface of the sliding plate.

According to another exemplary embodiment of the present invention, the top surfaces of the two side walls of the guide slot are higher than the outer surface of the sliding plate.

According to another aspect of the present invention, there is provided a connector assembly comprises a mating connector and the above connector which is mated with the mating connector.

In the above exemplary embodiments according to the present invention, the operator cannot push the latch safety to the pre-locking position by his fingers, which avoids the risk of accidental reset of the latch safety due to misoperation and improve the use safety.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
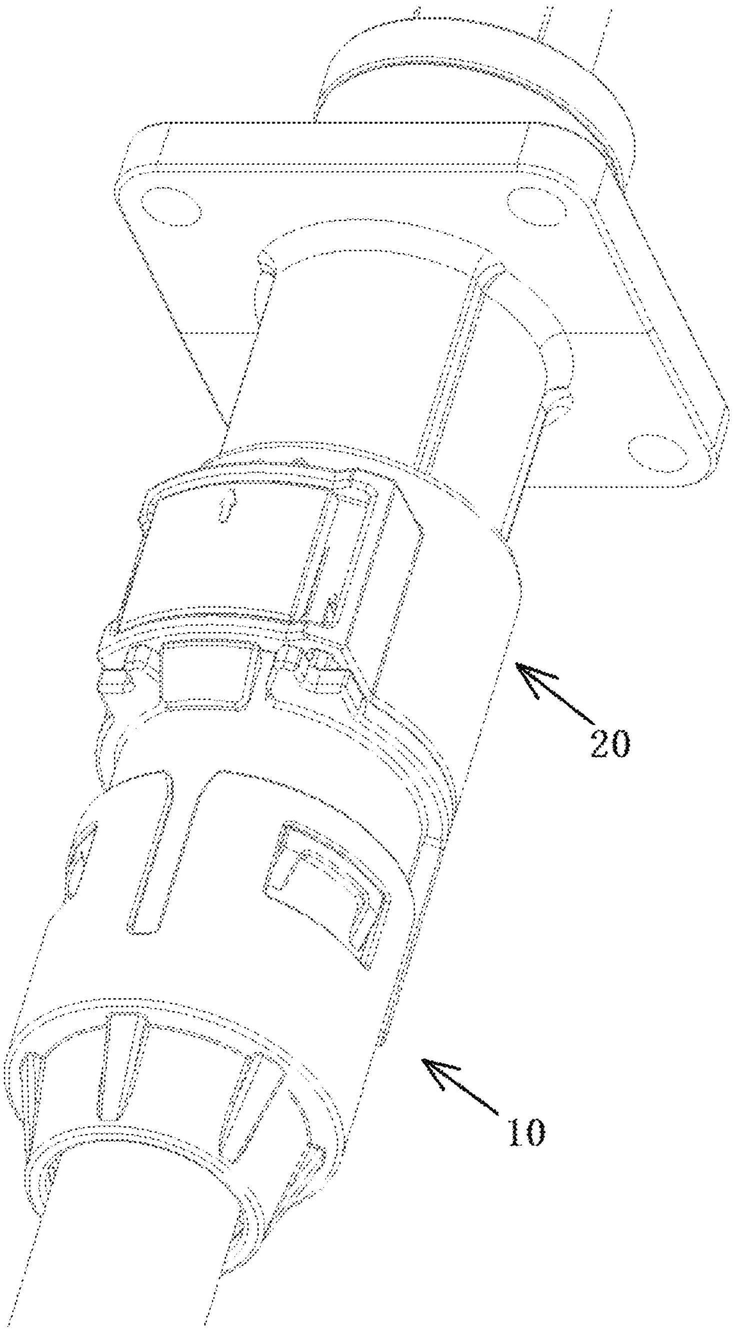
FIG. 1 shows a schematic diagram of a connector assembly according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a connector adapted to mate with a mating connector, the connector comprising: a housing; and a latch safety slidably mounted on the housing and adapted to move between a safety position to prevent the mating connector from being unlocked and a pre-locking position to allow the mating connector to be unlocked. A guide slot is formed on an outer wall of the connector and surrounded by a first end wall and a second end wall spaced from each other in a circumferential direction of the housing and two side walls spaced from each other in an axial direction of the housing; the latch safety includes a sliding plate slidably installed in the guide slot, and the sliding plate includes a first end and a second end spaced from each other in the circumferential direction and a front and rear sides spaced from each other in the axial direction; when the latch safety is moved to the safety position along the guide slot, the end face of the first end of the sliding plate abuts against the first end wall of the guide slot, so that a human finger cannot contact the end face of the first end of the sliding plate.

Figure 2:
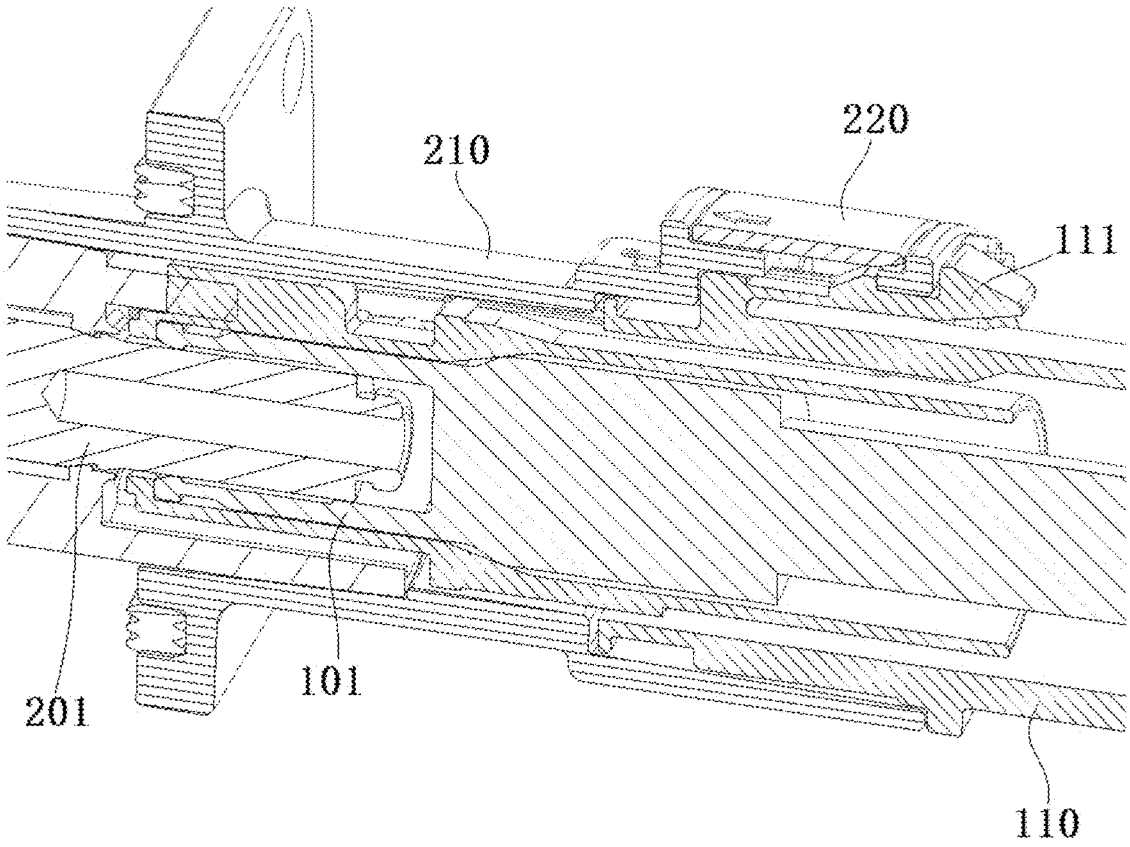
FIG. 2 shows a partial longitudinal sectional view of the connector assembly shown in FIG. 1.

FIG. 1 shows a schematic diagram of a connector assembly according to an exemplary embodiment of the present invention; FIG. 2 shows a partial longitudinal sectional view of the connector assembly shown in FIG. 1.

As shown in FIGS. 1 and 2, in the illustrated embodiment, the connector assembly mainly includes a first connector 10 and a second connector 20. One of the first connector 10 and the second connector 20 is a plug connector, and the other is a socket connector suitable for mating with the plug connector. In the illustrated embodiment, the first connector 10 is a plug connector and is connected to one end of the cable 1. The second connector 20 is a socket connector and is installed on electrical equipment (not shown). When the first connector 10 and the second connector 20 are mated together, the electrical connection between the cable 1 and the electrical equipment can be realized, so that power can be supplied to the electrical equipment through the cable 1.

Figure 3:
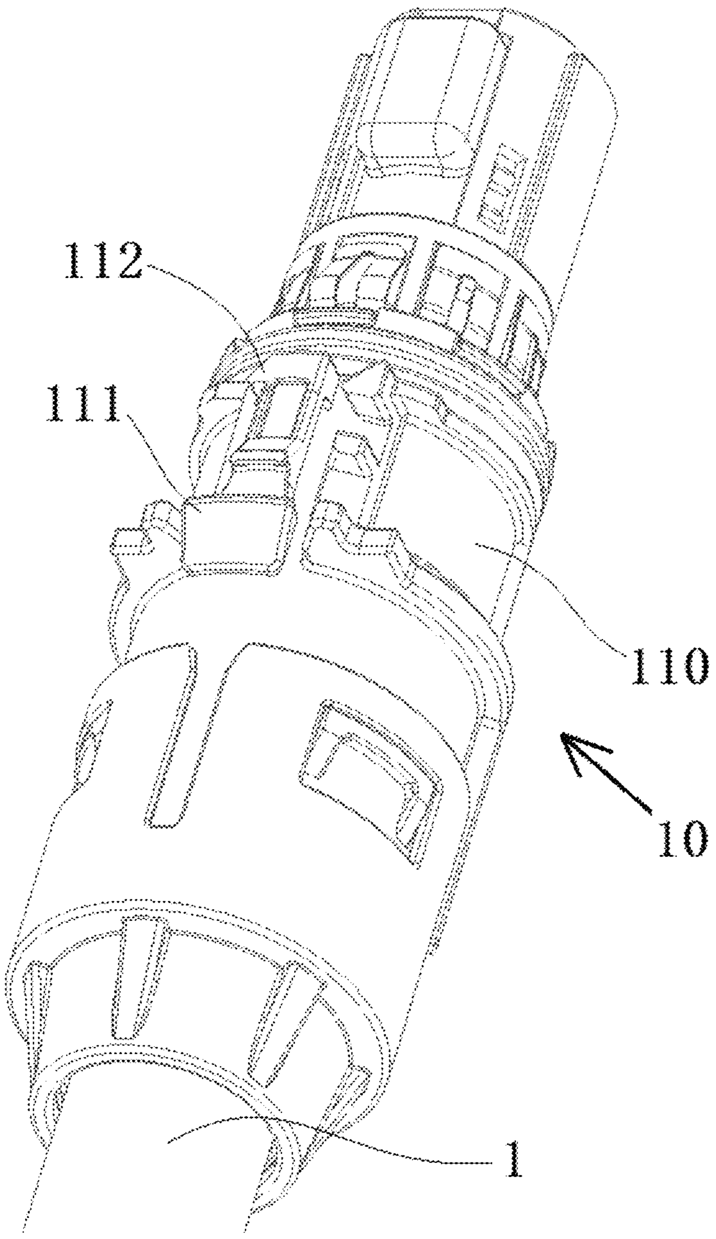
FIG. 3 shows a three-dimensional schematic diagram of the first connector in FIG. 1.

FIG. 3 shows a three-dimensional schematic diagram of the first connector 10 in FIG. 1. As shown in FIGS. 1 to 3, in the illustrated embodiment, the first connector 10 includes a first housing 110 and a first terminal 101 arranged in the first housing 110, and the first terminal 101 is arranged in the first terminal hole of the first housing 110. The second connector 20 includes a second housing 210 and a second terminal 201 arranged in the second housing 210. The second terminal 201 is arranged in the second terminal hole of the second housing 210. In the illustrated embodiment, one end of the first terminal 101 is crimped on the conductor of the cable 1, one end of the second terminal 201 can be electrically connected to the electrical equipment, and the other end of the second terminal 201 is inserted into the other end of the first terminal 101, so that the electrical connection between the cable 1 and the electrical equipment can be realized.

Figure 3A:
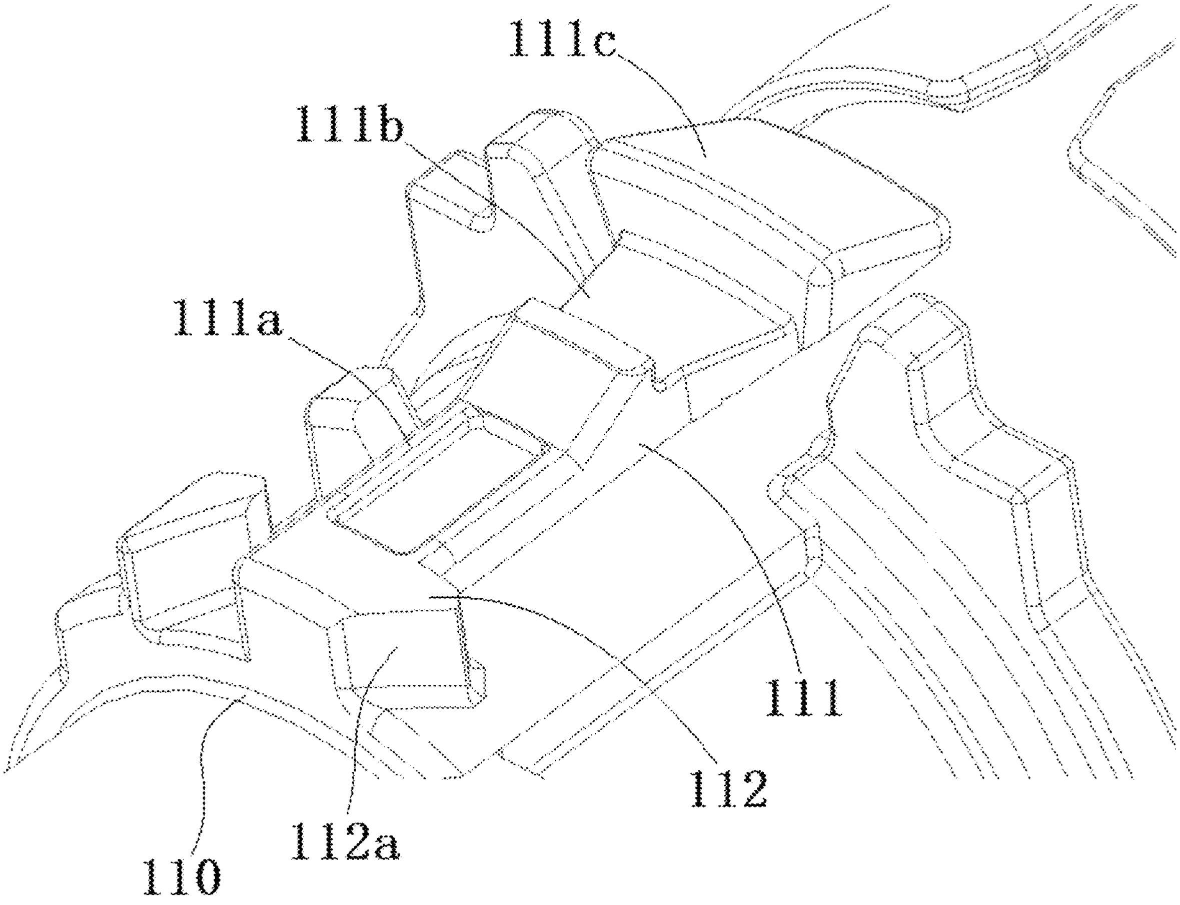
FIG. 3A shows a partially enlarged schematic diagram of the first connector in FIG. 1.
Figure 4:
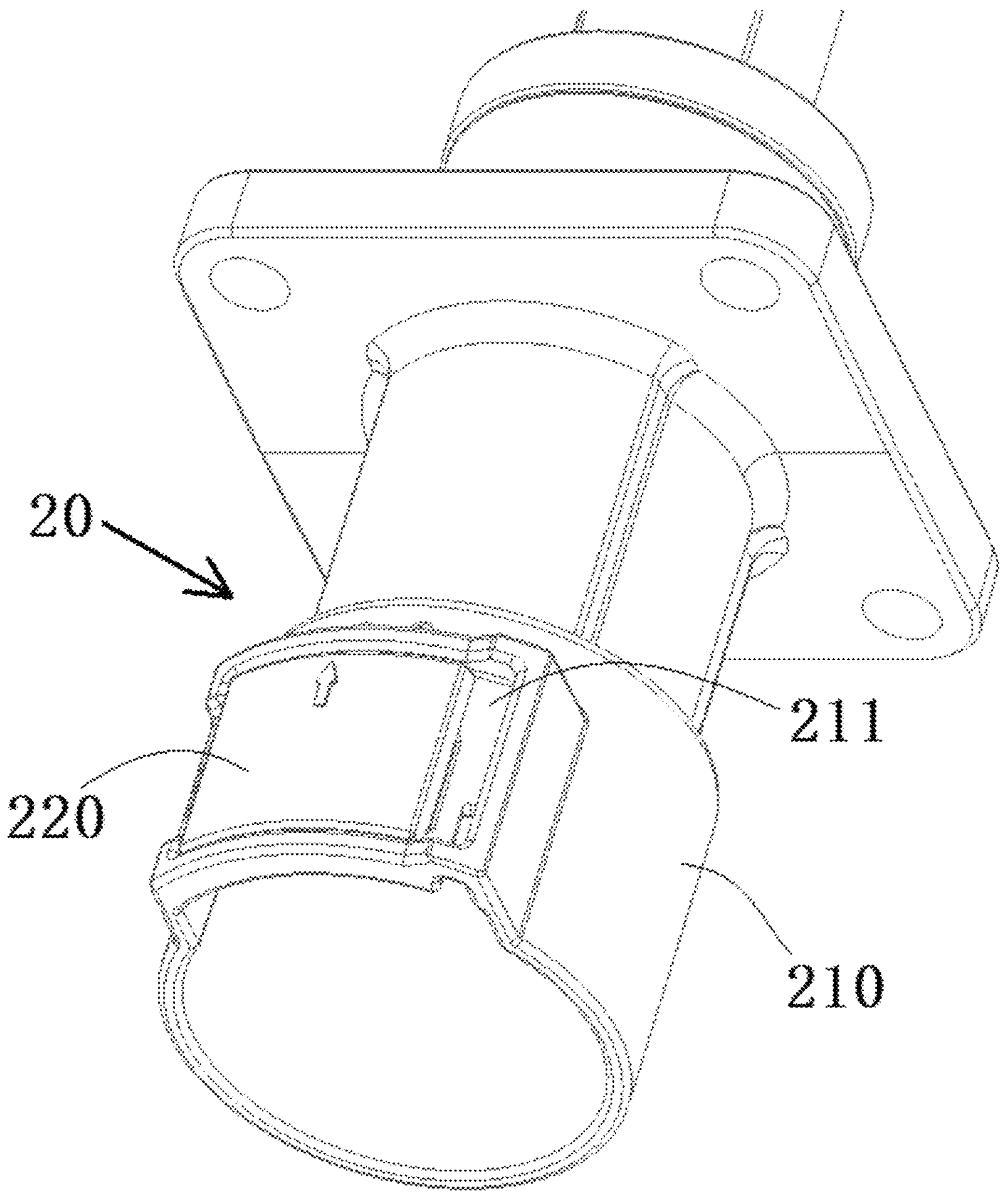
FIG. 4 shows a three-dimensional schematic diagram of the second connector in FIG. 1, in which a guide slot on the second connector and a latch safety installed in the guide slot are shown.

FIG. 3A shows a partially enlarged schematic diagram of the first connector 10 in FIG. 1; FIG. 4 shows a three-dimensional schematic diagram of the second connector 20 in FIG. 1, in which a guide slot 211 on the second connector 20 and a latch safety 220 installed in the guide slot 211 are shown.

As shown in FIGS. 1-4, in the illustrated embodiment, the first housing 110 is adapted to be partially inserted into the second housing 210 along an axial direction of the first housing 110 or the second housing 210, and an elastic latch 111 suitable for locking the second housing 210 is formed on the first housing 110. A latch safety 220 capable of moving along a circumferential direction of the second housing 210 is installed on the second housing 210.

Figure 7:
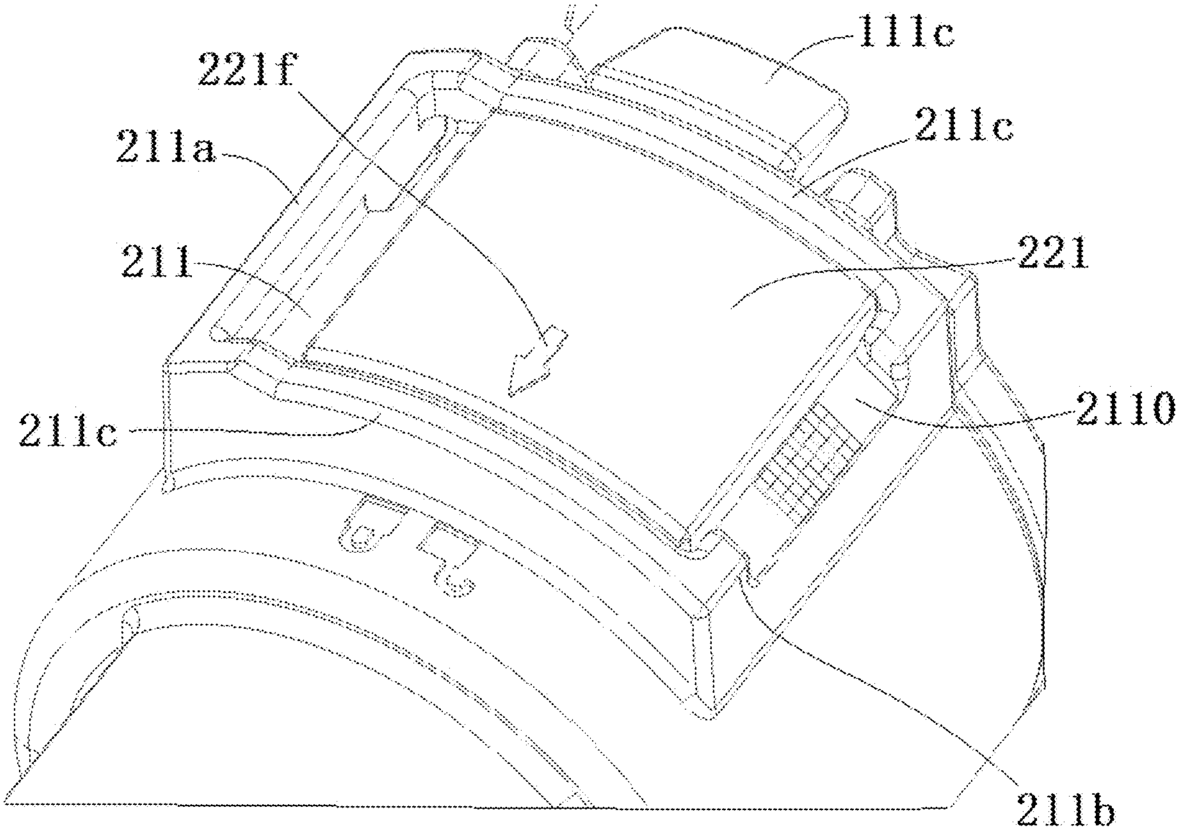
FIG. 7 shows a partially enlarged schematic diagram of the connector assembly shown in FIG. 1, wherein the latch safety is in the pre-locking position.
Figure 8:
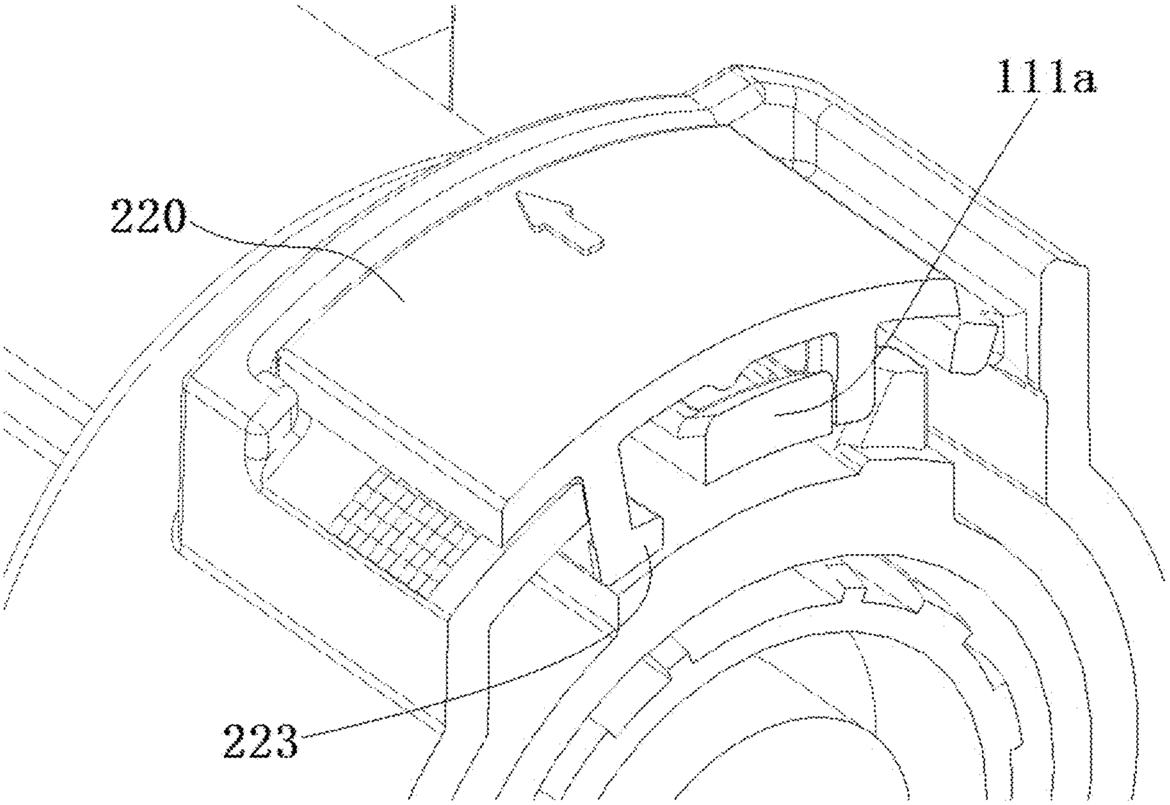
FIG. 8 shows a sectional view of the connector assembly shown in FIG. 7.
Figure 9:
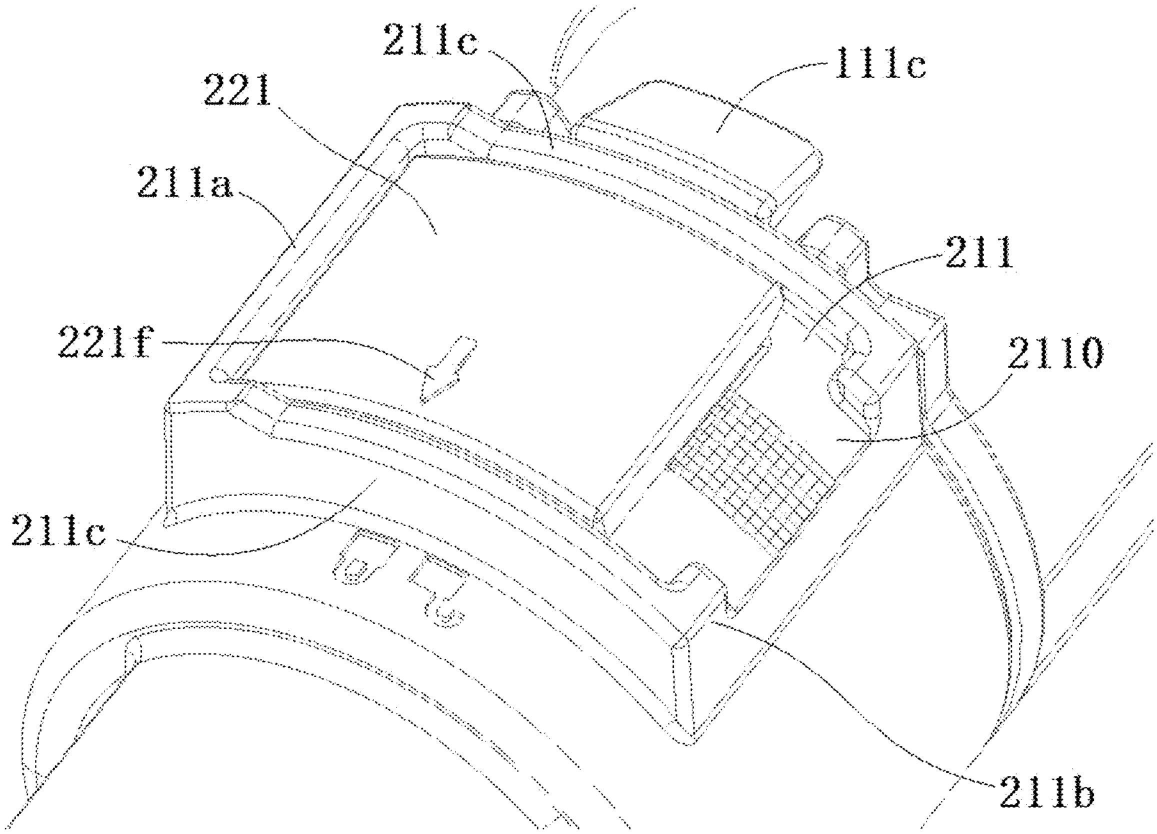
FIG. 9 shows a partially enlarged schematic diagram of the connector assembly shown in FIG. 1, wherein the latch safety is in the safety position.
Figure 10:
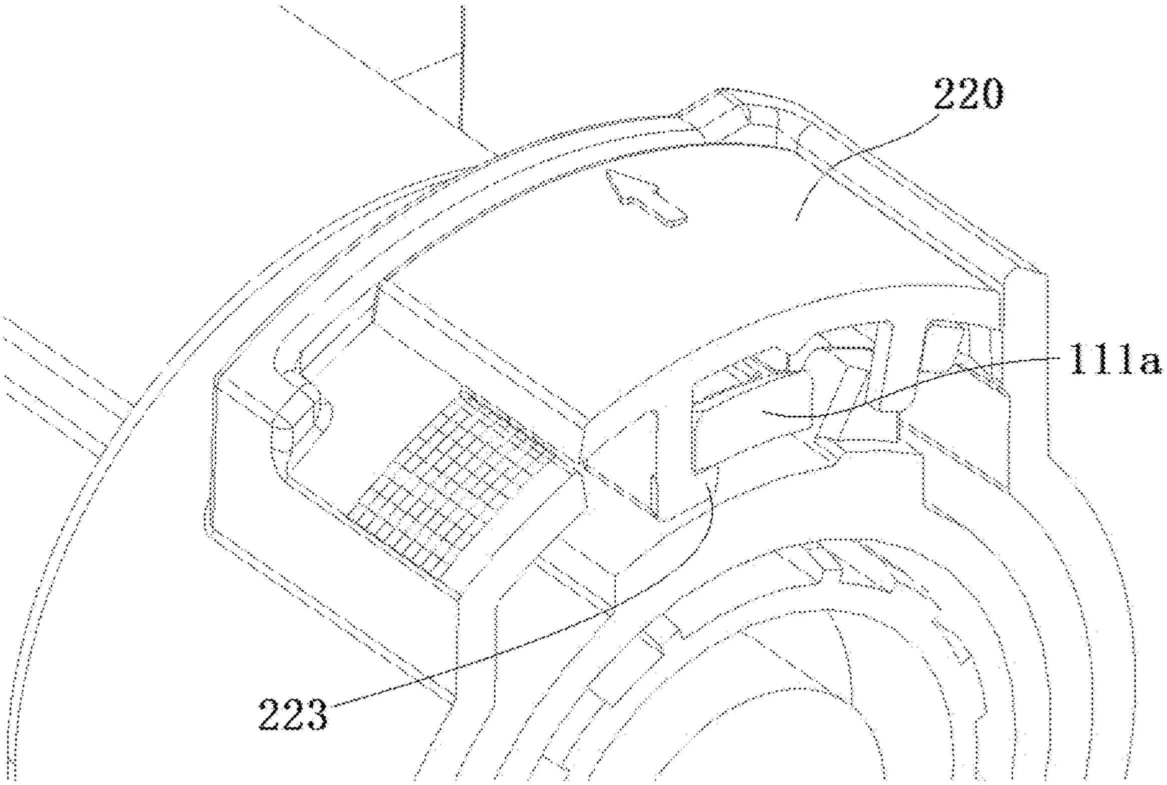
FIG. 10 shows a sectional view of the connector assembly shown in FIG. 9.

FIG. 7 shows a partially enlarged schematic diagram of the connector assembly shown in FIG. 1, wherein the latch safety is in the pre-locking position (or referred as an initial position); FIG. 8 shows a sectional view of the connector assembly shown in FIG. 7; FIG. 9 shows a partially enlarged schematic diagram of the connector assembly shown in FIG. 1, wherein the latch safety 220 is in the safety position; and FIG. 10 shows a sectional view of the connector assembly shown in FIG. 9.

As shown in FIGS. 1-4 to 7-10, in the illustrated embodiment, the latch safety 220 is adapted to move between the safety position (the position shown in FIGS. 9-10) to prevent the elastic latch 111 from being unlocked and the pre-locking position (the position shown in FIGS. 7-8) to allow the elastic latch 111 to be unlocked. In the illustrated embodiment, when the first connector 10 and the elastic latch 111 are pre installed on the second housing 210, the latch safety 220 is in the pre-locking position, and the elastic latch 111 is allowed to be unlocked.

Figure 5A:
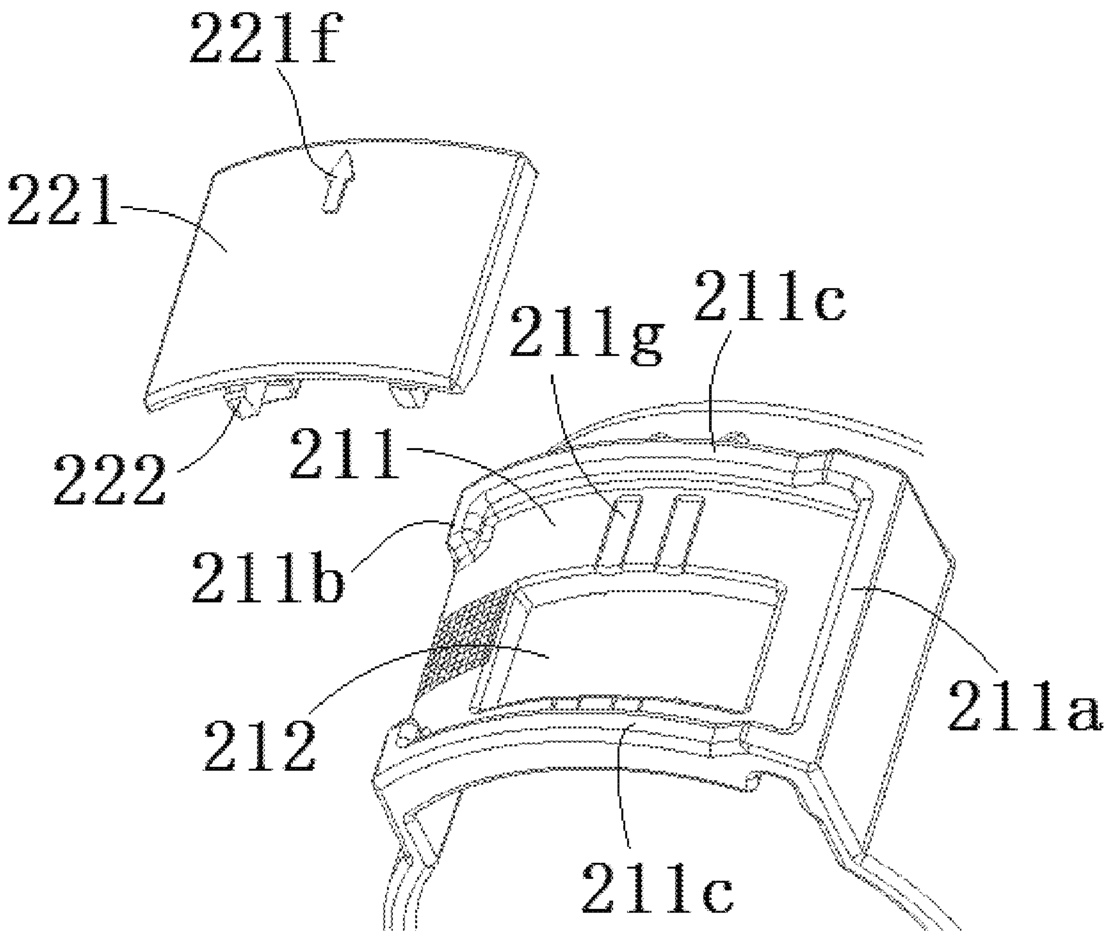
FIG. 5A shows a partially enlarged schematic view of FIG. 4 when viewed from the top, in which the guide slot on the second connector and the latch safety not yet installed in the guide slot are shown.
Figure 5B:
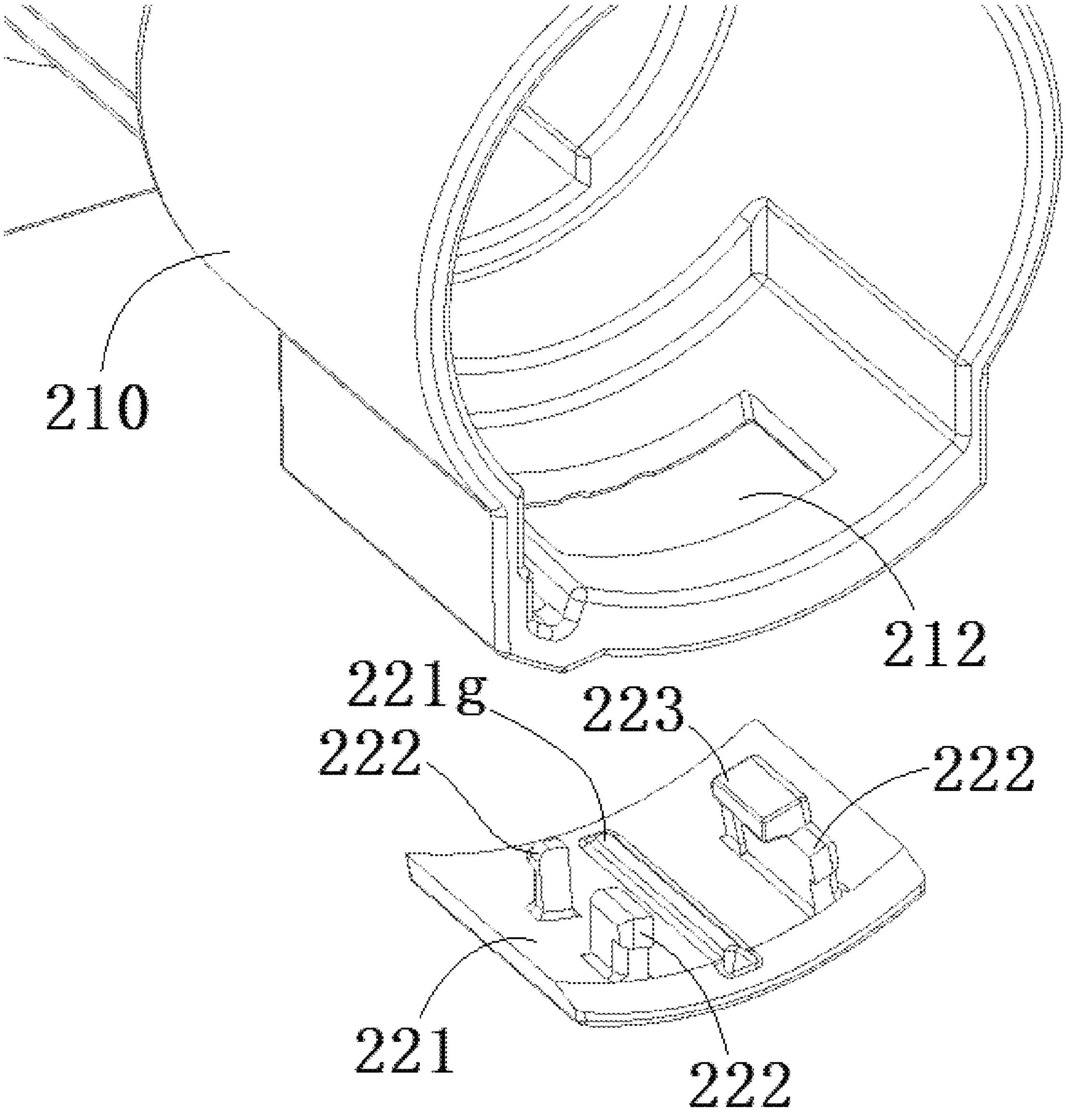
FIG. 5B shows a partially enlarged schematic view of FIG. 4 when viewed from the bottom, in which the guide slot on the second connector and the latch safety not yet installed in the guide slot are shown.
Figure 6:
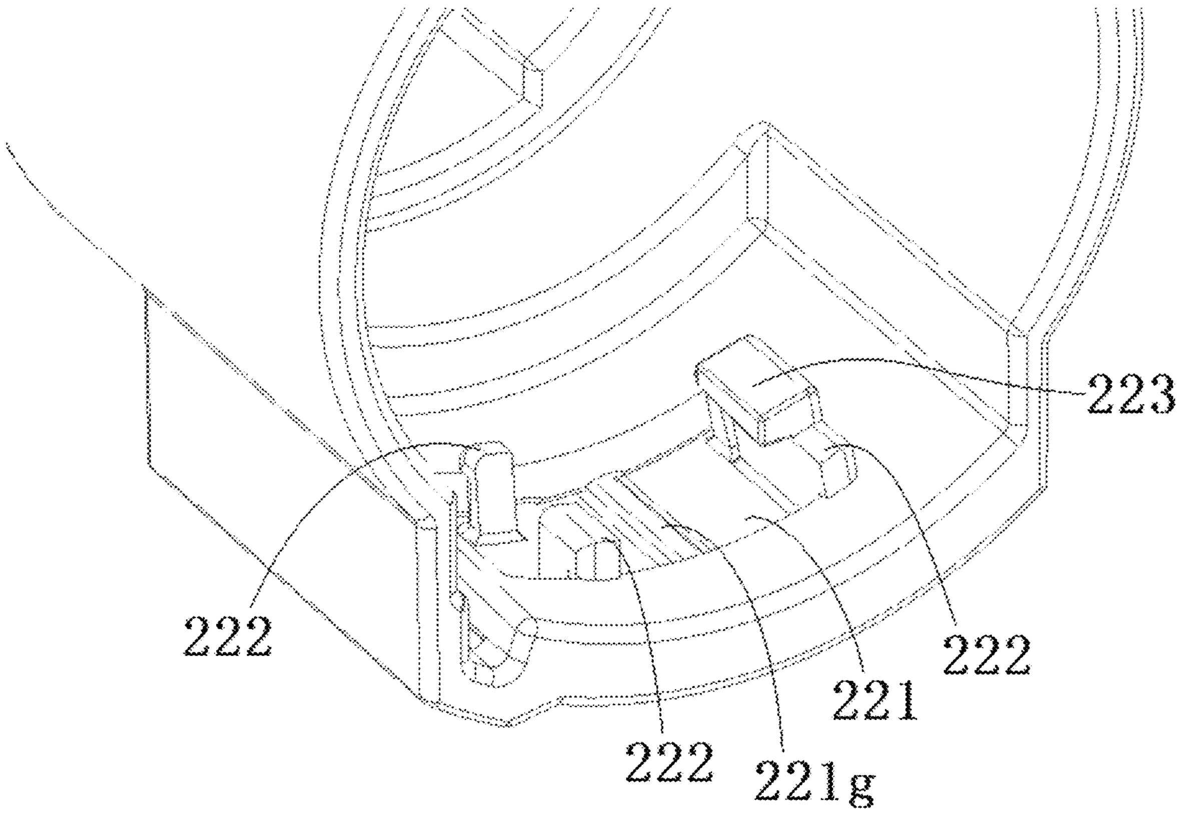
FIG. 6 shows the assembly diagram of the second housing and latch safety shown in FIGS. 5A and 5B.

FIG. 5A shows a partially enlarged schematic view of FIG. 4 when viewed from the top, in which the guide slot 211 on the second connector and the latch safety 220 not yet installed in the guide slot 211 are shown; FIG. 5B shows a partially enlarged schematic view of FIG. 4 when viewed from the bottom, in which the guide slot 211 on the second connector and the latch safety 220 not yet installed in the guide slot 211 are shown; FIG. 6 shows the assembly diagram of the second housing 210 and latch safety 220 shown in FIGS. 5A and 5B.

As shown in FIGS. 1 to 10, in the illustrated embodiment, a pushing part 112 is formed on the first housing 110, the pushing part 112 is adapted to push the latch safety 220 from the safety position to the pre-locking position at which the latch safety 220 does not interfere with the elastic latch 111 during the insertion of the first housing 110 into the second housing 210, so that the plug connector 10 can be inserted smoothly, and there will be no collision and interference between the elastic latch 111 and the latch safety 220.

As shown in FIG. 3A and FIGS. 6-10, in the illustrated embodiment, a guide slope 112*a* inclined to the axial direction of the first connector is formed on the pushing part 112, and the pushing part 112 contacts and pushes the latch safety 220 through the guide slope 112*a* to drive and guide the latch safety 220 to move from the safety position to the pre-locking position in the circumferential direction.

As shown in FIGS. 1 to 10, in the illustrated embodiment, a guide slot 211 extending along the circumferential direction is formed on the outer wall of the second housing 210, the latch safety 220 is slidably installed in the guide slot 211, and the guide slot 211 is used to guide the latch safety 220 to move between the safety position and the pre-locking position along the circumferential direction.

As shown in FIGS. 1 to 10, in the illustrated embodiment, the latch safety 220 mainly includes a sliding plate 221 and one or more limiting parts 222. The sliding plate 221 is an arc plate extending in the circumferential direction. The limiting part 222 is connected to the bottom surface of the sliding plate 221. An opening 212 is formed on the second housing 210, and the limiting part 222 extends into the second housing 210 through the opening 212. In the illustrated embodiment, the opening 212 is located on the bottom wall of the guide slot 211 and is completely covered by the sliding plate 221.

As shown in FIGS. 1 to 10, in the illustrated embodiment, the front and rear edges of the opening 212 opposite to each other in the axial direction are slidably held between the limiting part 222 and the sliding plate 221 to limit the movement of the latch safety 220 in the radial direction of the second housing 210. In this way, the latch safety 220 is allowed to move only in the circumferential direction in the guide slot 211.

As shown in FIGS. 1 to 10, in the illustrated embodiment, the elastic latch 111 mainly includes an elastic cantilever 111*a* and a locking portion 111*b*. The elastic cantilever 111*a* is connected to the first housing 110 and is adapted to move between a locking position and an unlocking position. The locking portion 111*b* is formed on the elastic cantilever 111*a* and is suitable for locking the second housing 210. The latch safety 220 includes a tongue 223 connected to the limiting part 222, which is adapted to be inserted into the gap between the elastic cantilever 111*a* and the outer wall of the first housing 110 to prevent the elastic cantilever 111*a* from be moved to the unlocking position. In this way, the risk of accidental unlocking of the elastic latch 111 caused by the operator's misoperation can be avoided. As shown in FIGS. 1 to 10, in the illustrated embodiment, the guide slope 112*a* of the pushing part 112 is adapted to contact and push the tongue 223 of the latch safety 220, so as to move the latch safety 220 from the safety position to the pre-locking position.

As shown in FIGS. 1 to 10, in the illustrated embodiment, the fixed end of the elastic cantilever 111*a* is connected with the pushing part 112 and is fixedly connected to the outer wall of the first housing 110 through the pushing part 112. However, the present invention is not limited to the illustrated embodiment, and the pushing part 112 may be separated from the elastic cantilever 111*a*.

As shown in FIGS. 1 to 10, in the illustrated embodiment, the elastic latch 111 also includes a pressing part 111*c* connected to the free end of the elastic cantilever 111*a*, which is exposed to the outside of the second housing 210 when the first housing 110 is inserted into the second housing 210 to allow human fingers to press the pressing part 111*c*. In this way, after the latch safety 220 is moved to the pre-locking position, the elastic latch 111 can be unlocked by pressing the pressing part 111*c* with a finger.

As shown in FIGS. 1 to 10, in the illustrated embodiment, two positioning grooves 211*g* extending along the axial direction are formed on the bottom wall of the guide slot 211, and a positioning rib 221*g* extending along the axial direction is formed on the inner surface of the sliding plate 221. When the latch safety 220 is installed in the guide slot

211 and moved to the safety position, the positioning rib 221*g* is positioned in one of the two positioning grooves 211*g*. When the latch safety 220 is installed in the guide slot 211 and moved to the pre-locking position, the positioning rib 221*g* is positioned in the other of the two positioning grooves 211*g*. The design of the positioning rib 221*g* and the positioning grooves 211*g* can not only enhance the operating hand feeling of the operator, but also position the latch safety 220 in the safety position and the pre-locking position respectively.

As shown in FIGS. 1 to 10, in the illustrated embodiment, an indication arrow 221*f* is formed on the outer surface of the sliding plate 221, and a safety position identification (for example, a closed lock identification, indicating that the elastic latch 111 cannot be unlocked) and a pre-locking position identification (for example, an opened lock identification, indicating that the elastic latch 111 can be unlocked) are formed on the outer wall of the second housing 210. When the latch safety 220 is installed in the guide slot 211 and moved to the safety position, the indication arrow 221*f* points to the safety position identification. When the latch safety 220 is installed in the guide slot 211 and moved to the pre-locking position, the indication arrow 221*f* points to the pre-locking position identification. Therefore, when the indication arrow 221*f* points to the pre-locking position identification, the pressing part 111*c* of the elastic latch 111 can be pressed by fingers to unlock the elastic latch 111.

As shown in FIGS. 4 to 10, in the illustrated embodiment, the guide slot 211 is surrounded by a first end wall 211*a* and a second end wall 211*b* opposite to each other in the circumferential direction and two side walls 211*c* opposite to each other in the axial direction. The latch safety 220 is adapted to move in the circumferential direction between the first end wall 211*a* and the second end wall 211*b* of the guide slot 211.

As shown in FIGS. 4 to 10, in the illustrated embodiment, the sliding plate 221 includes first and second ends opposite to each other in the circumferential direction and front and rear sides opposite to each other in the axial direction. The first and second ends of the sliding plate 221 respectively correspond to the first end wall 211*a* and the second end wall 211*b* of the guide slot 211, and the front and rear sides of the sliding plate 221 respectively correspond to the two side walls 211*c* of the guide slot 211.

As shown in FIGS. 4 to 10, in the illustrated embodiment, when the latch safety 220 is moved to the safety position along the guide slot 211, the end face of the first end of the sliding plate 221 abuts against the first end wall 211*a* of the guide slot 211, and the top surface of the first end wall 211*a* of the guide slot 211 is higher than the outer surface of the sliding plate 221, so that human fingers cannot contact the end face of the first end of the sliding plate 221. In this way, the operator cannot push the end face of the first end of the sliding plate 221 with his fingers to realize the reset of the latch safety 220, which avoids the false or accidental reset of the latch safety 220 and improves the use safety.

As shown in FIGS. 4 to 10, in the illustrated embodiment, the outer surface of the sliding plate 221 is a smooth surface, and in the illustrated embodiment, it is a smooth arc surface, so that the friction force between the human finger and the outer surface of the sliding plate 221 is not enough to push the latch safety 220 to move. In this way, the latch safety 220 can be further prevented from being wrongly or accidentally reset, thereby further improving the use safety.

As shown in FIGS. 4 to 10, in the illustrated embodiment, a slot 221*a* is formed on the end face of the first end of the sliding plate 221 or on the inner wall surface of the first end wall 211*a* of the guide slot 211. The slot 221*a* is arranged so that adult fingers cannot be inserted, but the corresponding tool (not shown, for example, a screwdriver with a flat head) can be inserted. Thus, the latch safety 220 can be moved from the safety position to the pre-locking position by a tool inserted into the slot 221*a*. Therefore, in the present invention, in order to realize the reset operation of the latch safety 220 from the safety position to the pre-locking position, a tool must be used, which cannot be realized by human fingers. Therefore, the invention can effectively prevent the latch safety 220 from being wrongly or accidentally reset due to the misoperation of the operator, and improve the use safety.

As shown in FIGS. 4 to 10, in the illustrated embodiment, the front and rear sides of the sliding plate 221 respectively abut against the two side walls 211*c* of the guide slot 211, and the top surfaces of the two side walls 211*c* of the guide slot 211 are higher than the outer surface of the sliding plate 221, so that human fingers cannot contact the front and rear sides of the sliding plate 221. In this way, the human hand cannot realize the reset of the latch safety 220 by grasping the sides of the front and rear sides of the sliding plate 221, which can further avoid the false or accidental reset of the latch safety 220, so as to further improve the use safety.

As shown in FIGS. 4 to 10, in the illustrated embodiment, a notch 2110 is formed on the second end wall 211*b* of the guide slot 211; and/or the top surface of the second end wall 211*b* of the guide slot 211 is lower than the outer surface of the sliding plate 221, to allow human fingers to contact the end face of the second end of the sliding plate 221. In this way, the sliding plate 221 can be pushed from the pre-locking position to the safety position by fingers.

As shown in FIGS. 4 to 10, in the illustrated embodiment, when the latch safety 220 is moved to the pre-locking position, the second end of the sliding plate 221 rests against the second end wall 211*b* of the guide slot 211. In this way, the latch safety 220 can be limited to the pre-locking position.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A connector adapted to mate with a mating connector, the connector comprising:

a housing; and a latch safety slidably mounted on the housing and adapted to move between a safety position to prevent the mating connector from being unlocked and a pre-locking position to allow the mating connector to be unlocked, wherein a guide slot is formed on an outer wall of the connector and surrounded by a first end wall and a second end wall spaced from each other in a circumferential direction of the housing and two side walls spaced from each other in an axial direction of the housing;

wherein the latch safety includes a sliding plate slidably installed in the guide slot, and the sliding plate includes a first end and a second end spaced from each other in the circumferential direction and a front and rear sides spaced from each other in the axial direction;

wherein when the latch safety is moved to the safety position along the guide slot, the end face of the first end of the sliding plate abuts against the first end wall of the guide slot, so that a human finger cannot contact the end face of the first end of the sliding plate.

2. The connector according to claim 1, wherein an outer surface of the sliding plate is a smooth surface, so that a friction force between the human finger and the outer surface of the sliding plate is not enough to push the latch safety to move.

3. The connector according to claim 1, wherein a slot is formed on the end face of the first end of the sliding plate or on an inner wall surface of the first end wall of the guide slot, the slot is configured to prohibit the human finger from being inserted, but allow a corresponding tool to be inserted, and the latch safety is capable of being moved from the safety position to the pre-locking position by the tool inserted into the slot.

4. The connector according to claim 1, wherein the front and rear sides of the sliding plate respectively abuts against the two side walls of the guide slot, so as to prevent the front and rear sides of the sliding plate from being contacted by the human finger.

5. The connector according to claim 1, wherein a notch is formed on the second end wall of the guide slot and/or the top surface of the second end wall of the guide slot is lower than the outer surface of the sliding plate, so as to allow the human finger to contact the end face of the second end of the sliding plate and push the sliding plate from the pre-locking position to the safety position.

6. The connector according to claim 1, wherein when the latch safety is moved to the pre-locking position, the second end of the sliding plate abuts against the second end wall of the guide slot.

7. The connector according to claim 1, wherein the latch safety also includes one or more limiting parts connected to the sliding plate, wherein an opening is formed on the housing, and the limiting part extends into the housing through the opening, wherein the front and rear edges of the opening opposite to each other in the axial direction are slidably held between the limiting part and the sliding plate to limit the movement of the latch safety in a radial direction of the housing.

8. The connector according to claim 7, wherein an elastic latch adapted to lock the connector is formed on the mating connector, and the latch safety includes a tongue connected to the limiting part;

wherein the tongue is adapted to be inserted into a gap between the elastic latch and the outer wall of the mating connector to prevent the elastic latch from being moved to an unlocked position.

9. The connector according to claim 1, wherein two positioning grooves extending along the axial direction are formed on a bottom wall of the guide slot, and a positioning rib extending along the axial direction is formed on an inner surface of the sliding plate;

wherein when the latch safety is installed in the guide slot and moved to the safety position, the positioning rib is positioned in one of the two positioning grooves;

wherein when the latch safety is installed in the guide slot and moved to the pre-locking position, the positioning rib is positioned in the other of the two positioning grooves.

10. The connector according to claim 1, wherein an indication arrow is formed on the outer surface of the sliding plate, and a safety position identification and a pre-locking position identification are formed on the outer wall of the housing;

wherein when the latch safety is installed in the guide slot and moved to the safety position, the indication arrow points to the safety position identification;

wherein when the latch safety is installed in the guide slot and moved to the pre-locking position, the indication arrow points to the pre-locking position identification.

11. The connector according to claim 1, further comprising:

a terminal provided in the housing.

12. The connector according to claim 1, wherein the top surface of the first end wall of the guide slot is higher than the outer surface of the sliding plate.

13. The connector according to claim 12, wherein the top surfaces of the two side walls of the guide slot are higher than the outer surface of the sliding plate.

14. A connector assembly, comprising:

a mating connector; and a connector mated with the mating connector, and the connector comprising:

a housing; and a latch safety slidably mounted on the housing and adapted to move between a safety position to prevent the mating connector from being unlocked and a pre-locking position to allow the mating connector to be unlocked, wherein a guide slot is formed on an outer wall of the connector and surrounded by a first end wall and a second end wall spaced from each other in a circumferential direction of the housing and two side walls spaced from each other in an axial direction of the housing;

wherein the latch safety includes a sliding plate slidably installed in the guide slot, and the sliding plate includes a first end and a second end spaced from each other in the circumferential direction and a front and rear sides spaced from each other in the axial direction;

wherein when the latch safety is moved to the safety position along the guide slot, the end face of the first end of the sliding plate abuts against the first end wall of the guide slot, so that a human finger cannot contact the end face of the first end of the sliding plate.

* * * * *